United States Patent
Mestanov et al.

(10) Patent No.: US 10,237,894 B2
(45) Date of Patent: Mar. 19, 2019

(54) WIRELESS DEVICE, AN ACCESS POINT AND METHODS USING DIFFERENT CLEAR CHANNEL ASSESSMENT (CCA) THRESHOLDS

(71) Applicant: Telefonaktiebolaget LM Ericsson (publ), Stockholm (SE)

(72) Inventors: Filip Mestanov, Brottby (SE); Johan Söder, Stockholm (SE); Soma Tayamon, Stockholm (SE); Yu Wang, Solna (SE); Gustav Wikström, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/572,237

(22) PCT Filed: Jun. 1, 2015

(86) PCT No.: PCT/SE2015/050636
§ 371 (c)(1),
(2) Date: Nov. 7, 2017

(87) PCT Pub. No.: WO2016/195550
PCT Pub. Date: Dec. 8, 2016

(65) Prior Publication Data
US 2018/0110073 A1    Apr. 19, 2018

(51) Int. Cl.
*H04W 28/02*    (2009.01)
*H04W 74/08*    (2009.01)
(Continued)

(52) U.S. Cl.
CPC ... *H04W 74/0825* (2013.01); *H04W 28/0236* (2013.01); *H04W 40/12* (2013.01);
(Continued)

(58) Field of Classification Search
None
See application file for complete search history.

(56) References Cited

U.S. PATENT DOCUMENTS

| | | |
|---|---|---|
| 2013/0017794 A1 | 1/2013 | Kloper et al. |
| 2014/0198741 A1 | 7/2014 | Barriac et al. |

(Continued)

FOREIGN PATENT DOCUMENTS

| | | |
|---|---|---|
| EP | 2775776 A1 | 9/2014 |
| WO | 2015009878 A1 | 1/2015 |

OTHER PUBLICATIONS

Coffey, Sean et al., "Spatial Reuse AP Management", IEEE 802.11-15/0105r0, Jan. 11, 2015, 1-9.
(Continued)

*Primary Examiner* — Brian S Roberts
(74) *Attorney, Agent, or Firm* — Murphy, Bilak & Homiller, PLLC (57) ABSTRACT

An Access Point, AP, and a wireless device as well as a method performed by the AP and a method performed by the wireless device for communication with the other are provided. The method performed by the AP comprises using (130) a first Clear Channel Assessment Threshold, CCAT for a first Quality of Service, QoS, category and at least a second CCAT for a second QoS category for communication with the wireless device.

16 Claims, 8 Drawing Sheets

(51) Int. Cl.
*H04W 74/00* (2009.01)
*H04W 40/12* (2009.01)
*H04W 84/12* (2009.01)

(52) U.S. Cl.
CPC ..... *H04W 74/006* (2013.01); *H04W 74/0816* (2013.01); *H04W 74/0808* (2013.01); *H04W 84/12* (2013.01)

(56) References Cited

U.S. PATENT DOCUMENTS

| | | | | |
|---|---|---|---|---|
| 2015/0016268 A1* | 1/2015 | Merlin | .............. | H04W 28/0268 370/236 |
| 2015/0163824 A1* | 6/2015 | Krzymien | ............. | H04W 28/18 370/338 |
| 2016/0080974 A1* | 3/2016 | Barriac | ............... | H04L 43/0882 370/236 |
| 2016/0227489 A1* | 8/2016 | Oteri | ................. | H04W 74/0808 |

OTHER PUBLICATIONS

Hedayat, Reza et al., "Adaptive CCA for 11 ax", IEEE 802.11-14/1233r2, Sep. 14, 2014, 1-14.

IEEE, "Part 11: Wireless LAN Medium Access Control (MAC) and Physical Layer (PHY) Specifications", IEEE Computer Society, IEEE Std. 802.11-2012, Mar. 29, 2012, 1-2793.

Jafarian, Amin et al., "EDCA Parameters", IEEE 802.11-12/861r0, Jul. 16, 2012, 1-10.

Zhao, Hui et al., "EDCA Enhancements for HEW", IEEE 802.11-13/1077r1, Sep. 15, 2013, 1-11.

\* cited by examiner

| AC | CWmin | CWmax | AIFSN | TXOP limit |
|---|---|---|---|---|
| AC_BK | *aCWmin* | *aCWmax* | 7 | *2.528 ms* |
| AC_BE | *aCWmin* | *aCWmax* | 3 | *2.528 ms* |
| AC_VI | *(aCWmin+1)/2 − 1* | *aCWmin* | 2 | *4.096 ms* |
| AC_VO | *(aCWmin+1)/4 − 1* | *(aCWmin+1)/2 − 1* | 2 | *2.080 ms* |

Fig. 3c

| AC | CWmin | CWmax | AIFSN | TXOP limit | CCAT |
|---|---|---|---|---|---|
| AC_BK | *aCWmin* | *aCWmax* | 7 | *2.528 ms* | *-72 dBm* |
| AC_BE | *aCWmin* | *aCWmax* | 3 | *2.528 ms* | *-78dBm* |
| AC_VI | *(aCWmin+1)/2 − 1* | *aCWmin* | 2 | *4.096 ms* | *-82 dBm* |
| AC_VO | *(aCWmin+1)/4 − 1* | *(aCWmin+1)/2 − 1* | 2 | *2.080 ms* | *-82 dBm* |

Fig. 3d

| AC of traffic to transmit | AC of sensed neighbor BSS traffic | CCAT |
|---|---|---|
| AC_BK | AC_BK or AC_BE | *-72 dBm* |
| AC_BE | AC_BK or AC_BE | *-78dBm* |
| AC_VI | All | *-82 dBm* |
| AC_VO | All | *-82 dBm* |
| All | AC_VI | *-82 dBm* |
| All | AC_VO | *-82 dBm* |

WIRELESS DEVICE, AN ACCESS POINT AND METHODS USING DIFFERENT CLEAR CHANNEL ASSESSMENT (CCA) THRESHOLDS

TECHNICAL FIELD

The present disclosure relates to wireless communication and in particular to communication between an Access Point, AP, and a wireless device.

BACKGROUND

In Institute of Electrical and Electronics Engineers, IEEE, Wi-Fi (also known as Wireless Local Area Network, WLAN, and these terms will be used interchangeably throughout this document) is standardised in the 802.11 specifications (IEEE Standard for Information technology—Tele-communications and information exchange between systems. Local and metropolitan area networks—Specific requirements. Part 11: Wireless LAN Medium Access Control (MAC) and Physical Layer (PHY) Specifications). Wi-Fi is a technology that currently mainly operates on the 2.4 GHz or the 5 GHz band. The IEEE 802.11 specifications regulate the access points' or wireless terminals' physical layer, MAC layer and other aspects to secure compatibility and inter-operability between access points and portable terminals. Wi-Fi is generally operated in unlicensed bands, and as such, communication over Wi-Fi may be subject to interference sources from any number of both known and unknown devices. Wi-Fi is commonly used as wireless extensions to fixed broadband access, e.g. in domestic environments and hotspots, like airports, train stations and restaurants.

The WLAN technology relies on Carrier Sensing Multiple Access with Collision Avoidance, CSMA/CA, in order to effectively and fairly share the wireless medium among different WLAN entities and even different Radio Access Technologies, RAT. CSMA/CA applied by the WLAN system demands that every device that wishes to send data senses the common communication channel before carrying a transmission in order to avoid duplicate transmissions (usually resulting in loss of data and need of retransmissions). In order for a device to deem the channel busy, it has to detect a transmission, the received signal strength level of which surpasses a pre-determined threshold, referred to as the Clear Channel Assessment, CCA, threshold, CCAT.

A problem may be that an AP or wireless device may refrain from accessing the medium since it is exposed to concurrent transmissions in neighbouring Basic Service Sets, BSSs, although simultaneous communication would be possible. This limits the performance of current systems, especially as the CCA threshold used today is very low, −82 dBm.

In the past, WLANs were mainly used to transport low-bandwidth, data-application traffic. Currently, with the expansion of WLANs into vertical (such as retail, finance, and education) and enterprise environments, WLANs are used to transport high-bandwidth data applications, in conjunction with time-sensitive multimedia applications. Consequently, the load of the WLANs has increased substantially during the last years and is likely to increase even further. With increased traffic, denser WLANs, the interference may increase and it may reduce the probability of an AP and/or a wireless device to swiftly access a channel or radio resources of the WLAN.

SUMMARY

The object is to obviate at least some of the problems outlined above. In particular, it is an object to provide an AP, a wireless device and respective methods performed thereby for communicating with each other. These objects and others may be obtained by providing an AP and a wireless device as well as a method performed by an AP and a method performed by a wireless device according to the independent claims attached below.

According to an aspect a method performed by an AP in a WLAN for communicating with a wireless device is provided. The WLAN employs contention based access for radio resources. The method comprises using a first CCAT for a first Quality of Service, QoS, category and at least a second CCAT for a second QoS category for communication with the wireless device.

According to an aspect, a method performed by a wireless device for communicating with an AP is provided. The WLAN employs contention based access for radio resources. The method comprises determining a CCAT for a QoS category of data to be transmitted to the AP, wherein at least two different QoS categories are associated with different CCATs; determining whether the channel is busy or free using the determined CCAT: and transmitting data to the AP when the channel is determined to be free.

According to another aspect, an AP in a WLAN for communicating with a wireless device is provided. The WLAN employs contention based access for radio resources. The AP is configured for using a first CCAT for a first QoS category and at least a second CCAT for a second QoS category for communication with the wireless device.

According to yet another aspect, a wireless device in a WLAN for communicating with an AP is provided. The WLAN employs contention based access for radio resources. The wireless device is configured for determining, a CCAT for a QoS category of data to be transmitted to the AP, wherein at least two different QoS categories are associated with different CCATs; for determining whether the channel is busy or free using the determined CCAT; and for transmitting data to the AP when the channel is determined to be free.

The method performed by the AP and the method performed by the wireless device as well as the AP and the wireless device may have several advantages. One possible advantage is that the flexibility of the QoS framework is improved and/or increased by introducing another degree of freedom to the parameters that can be adjusted in order to provide statistical differentiation between different traffic types.

BRIEF DESCRIPTION OF DRAWINGS

Embodiments will now be described in more detail in relation to the accompanying drawings, in which.

DETAILED DESCRIPTION

Briefly described, an AP and a wireless device as well as a method performed by the AP and a method performed by the wireless device for communication with the other are provided. The AP and the wireless device are operable in a WLAN employing contention based access for radio resources. When the AP or wireless device senses the channel, or radio resources, in order to determine if the channel is busy or free, the AP and the wireless device uses different CCATs depending on the QoS category of the data that the AP or the wireless device is to send to the receiving party.

Embodiments herein relate to a method performed by an Access Point, AP, operable in a WLAN for communicating with a wireless device, the WLAN employing contention based access for radio resources.

Figure 1A:
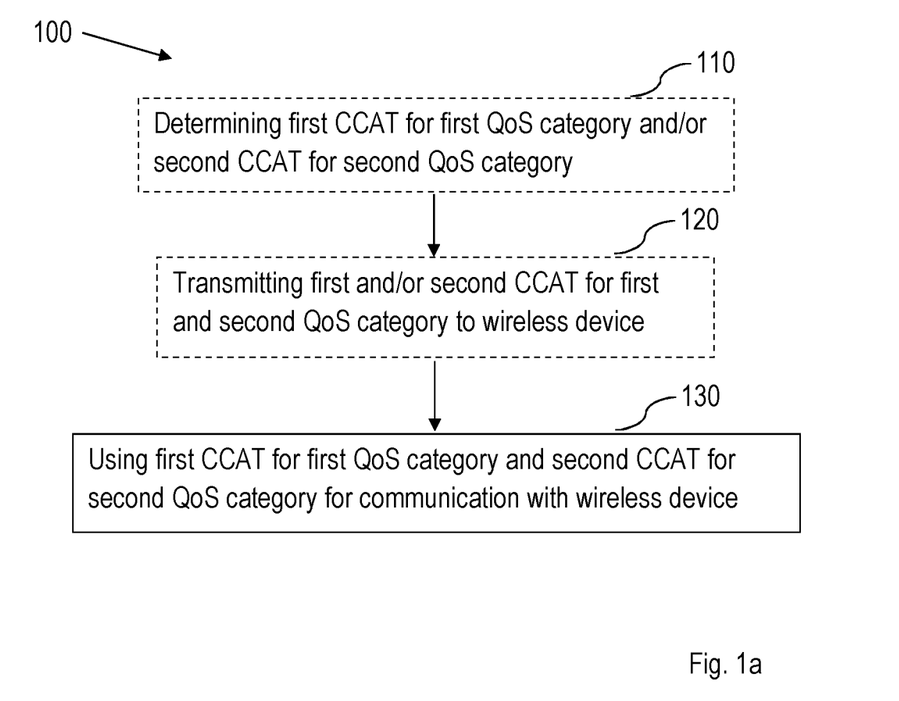
FIG. 1a is a flowchart of a method performed by an AP operable in a WLAN for communicating with a wireless device according to an exemplifying embodiment.

Embodiments of such a method will now be described with reference to FIGS. 1a-1c. FIG. 1a illustrates the method comprising using 130 a first Clear Channel Assessment Threshold, CCAT for a first Quality of Service, QoS, category and at least a second CCAT for a second QoS category for communication with the wireless device.

Different types of data that is to be transmitted by the AP may be associated with different QoS categories. Merely as a non-limiting example, some data may be very time critical and some data may not be time critical. Different services, such as voice, video, file transfer etc. may be associated with different QoS or QoS categories.

Different QoS categories are associated with a respective CCAT, such that a first QoS category is associated with a first CCAT, a second QoS category is associated with a second CCAT, a third QoS category is associated with a third CCAT, and so on. There is at least two different CCATs, hence there is at least two predefined QoS categories. There may be more QoS categories than there are CCATs as some QoS categories may be assigned or associated with the same CCAT. Hence, there is at least a CCAT associated with a first QoS category, and a second CCAT associated with a second QoS category.

When the AP communicates with the wireless device, e.g. transmits data to the wireless device, the AP ascertains that the channel, or radio resources, are free to be used for the transmission to the wireless device. Depending on the QoS category of the data that the AP is to transmit to the wireless device, the AP uses the corresponding CCAT when sensing the channel and ascertaining that the channel is free or busy.

Thus, when the AP is to transmit data of the first QoS category, the AP uses the first CCAT when sensing the channel and ascertaining that the channel is free or busy; and when the AP is to transmit data of the second QoS category, the AP uses the second CCAT when sensing the channel and ascertaining that the channel is free or busy.

It shall be noted that FIG. 1a illustrates also a box 110 and a box 120, both having dotted lines to illustrate that they are not compulsory to this embodiment as will be explained below.

The method performed by the AP may have several advantages. One possible advantage is that the flexibility of the QoS framework is improved and/or increased by introducing another degree of freedom to the parameters that can be adjusted in order to provide statistical differentiation between different traffic types.

The method may further comprise determining 110 the first CCAT and/or the second CCAT for the first and second QoS category.

The different CCATs for the individual QoS categories, i.e. at least first CCAT of the first QoS category and the second CCAT of the second QoS category may be determined by the AP based on different information. For example, transmission traffic type, sensed traffic type or a combination thereof may be used as a base to determine the different CCATs for the individual QoS categories.

Alternatively, the different CCATs for the individual QoS categories may be predefined; or they may be determined by higher layers, e.g. an Operation, Administration and Maintenance, OAM, system or Operation Support System, OSS, and then signalled to the AP.

It shall be pointed out that the AP may determine a first and second CCAT for the first and second QoS category respectively to use for itself and another first and second CCAT for the first and second QoS category respectively to be used by the wireless device.

Still further, the method may comprise transmitting 120 the first CCAT and/or the second CCAT for the first and second QoS category to the wireless device.

In the cases that (i) the AP determines the different CCATs for the individual QoS categories, i.e. the first CCAT for the first QoS category and at least the second CCAT for the second QoS category, or (ii) the CCATs are determined by higher layers and signalled to the AP, the AP has to inform the wireless device in case the wireless device also has the use the different CCATs for different QoS categories of data that the wireless device wants to transmit to the AP. This will be explained in more detail below.

In the case that the different CCATs are predefined, the wireless device may already have this information hard-coded into a memory of the wireless device and then there is no need for the AP to transmit the first and at least the second CCAT for the first and at least the second QoS category.

Further as described above, the AP may determine a first set of first and second CCATs for the first and second QoS category respectively for itself and a second set of first and second CCATs for the first and second QoS category respectively for the wireless device. If so, then the AP transmits the second set of first and second CCATs for the first and second QoS category respectively for the wireless device to the wireless device.

In an example, the determining 110 of the first and/or second CCAT comprises determining respective intervals for the first and second CCATs within which the first and the second CCATs may vary.

By determining respective intervals for the first and second CCATs within which the first and the second CCATs may vary, the AP (and also the wireless device) may have the liberty to adapt the CCAT based on a specific mechanism, e.g. setting the CCAT based on the measured Received Signal Strength, RSS, from the wireless device (for the AP), or from the AP (for the wireless device). Another example may be that the AP/wireless device adjusts the CCAT based on the fraction of failed packets (Block Error Rate, BLER).

Figure 1B:
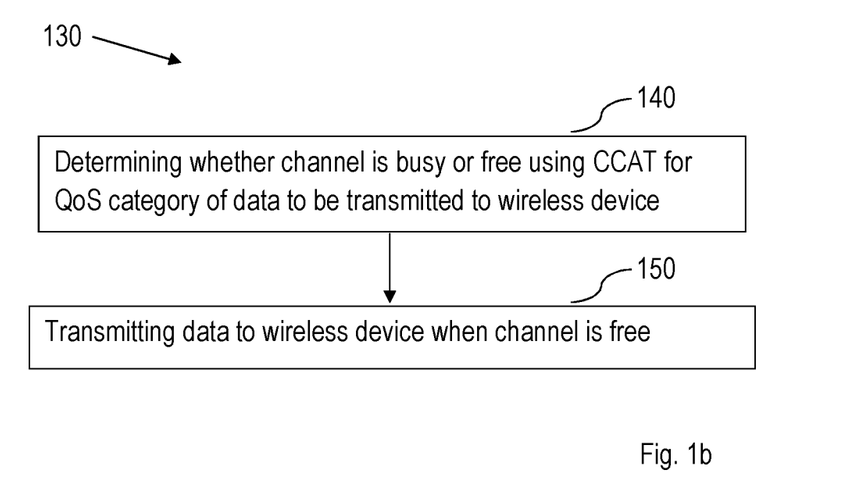
FIG. 1b is a flowchart of a method performed by an AP operable in a WLAN for communicating with a wireless device according to another exemplifying embodiment.

The method may further comprise, as illustrated in FIG. 1b, when using 130 the determined first and/or second CCAT for communication with the wireless device, determining 140 whether the channel is busy or free using the CCAT for the QoS category of the data to be transmitted to the wireless device; and transmitting 150 data to the wireless device when the channel is free.

When the AP senses the channel, it may detect, or receive, signals or energy on the channel, or the radio resources of the channel. The signals/energy may be of different strengths, or energy levels.

In order to determine, or ascertain, whether the channel is busy or free, the AP compares the detected/received signals/energy to the CCAT associated with the QoS category of the data to be transmitted to the wireless device.

For example, if the data to be transmitted to the wireless device has a relatively high priority meaning that the QoS category is of relatively high priority, the CCAT for that QoS category may be lower than the CCAT for a QoS of relatively low priority. In this manner, it may be more probable that the AP finds the channel free using a lower CCAT than using a higher CCAT. Consequently, if the data to be sent to the wireless device has high priority, it may be more probable that the AP finds the channel free than if the data to be sent to the wireless device has low priority.

The determining 140 of whether the channel is busy or free may further be based on a QoS category of data that is currently being transmitted on the channel as discovered during the determining 140 of whether the channel is busy or free.

The AP may receive packets or signals currently being transmitted on the channel when the AP senses the channel in order to determine if the channel is free or busy. The AP may then decode the packets/signals, perform some analysis of the packet or perform deep packet inspection in order to determine the QoS category of data that is currently being transmitted on the channel.

Using the obtained information about the QoS category of data that is currently being transmitted on the channel, the AP may determine if the channel is busy or free. Thus, not only is the CCAT for the QoS category of the data to be transmitted used to determine whether the channel is free or busy, but also the QoS category of data that is currently being transmitted on the channel.

By using both the QoS category for the data that is to be transmitted and the QoS category of data that is currently being transmitted on the channel, the AP may make a more well-founded decision of whether the channel is busy or free.

In an example, the channel is determined to be free if the level of the QoS category of the data to be transmitted to the wireless device is of higher priority than the level of the QoS category of data that is currently being transmitted on the channel.

By using the different QoS categories of the data to be transmitted to the wireless device and the QoS category of data that is currently being transmitted on the channel, the AP may ascertain that when it has high priority data that is to be transmitted, i.e. data of a QoS category having a high priority level, the probability that this data will be sent with a minimum of delay may be relatively high.

Comparing the priority level of the different QoS categories may help the AP to increase the probability that the data of the QoS category of a high priority level will be sent in time. Assuming the AP detects traffic on the channel using the CCAT for the data of its QoS category which is of a high priority level. The AP may inspect, analyse, or decode the detected traffic in order to determine its QoS category. Even if the AP detects traffic on the channel, it does not automatically refrain from transmitting its data to the wireless device. Rather, if the priority level of the QoS category of the detected traffic is lower than the priority level of the QoS category of the data to be transmitted to the wireless device, the AP may determine that the channel is free and transmit the data to the wireless device.

By increasing the CCAT for a certain QoS category, the traffic of that access class has increased probability of accessing the channel, but it comes at a risk of suffering from interference. Therefore the CCAT may e.g. only be increased for traffic types that are not sensitive to losing packets (e.g. it may not be suitable for voice and video but rather for best effort or background).

The respective QoS categories may be associated with Access Categories.

There are four different QoS differentiations in the IEEE 802.11-2012 standard, referred to as access categories. These categories are Voice (VO), Video (VI), Best Effort (BE) and Background (BK). The method performed by the AP may be employed by an AP operable in a network based on the IEEE 802.11 standard, wherein these already defined access categories may be used. However, it shall be pointed out that the access categories may be defined in other ways, e.g. when the AP is operable in a network based on another standard.

Figure 1C:
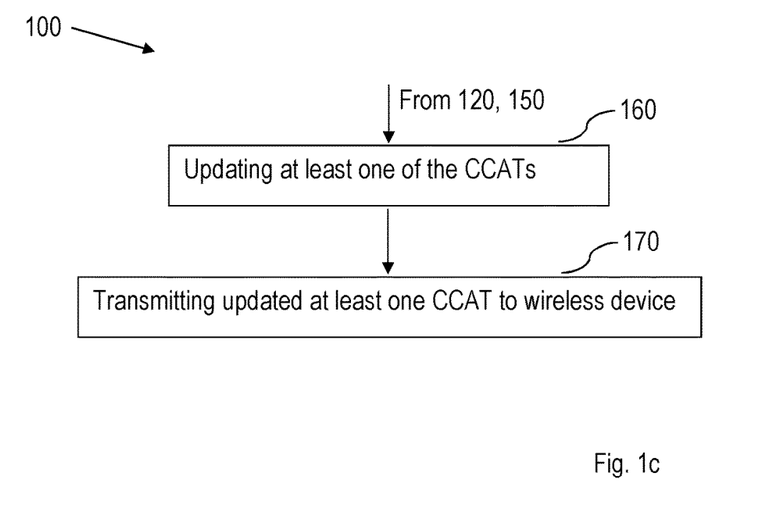
FIG. 1c is a flowchart of a method performed by an AP operable in a WLAN for communicating with a wireless device according to yet another exemplifying embodiment.

The method may further comprise, as illustrated in FIG. 1c, updating 160 at least one of the CCATs and transmitting 170 the updated at least one CCAT to the wireless device.

It may be that different circumstances change requiring that at least one of the CCATs may need to be updated. There may be several reasons why at least one CCAT may need to be updated, e.g. due to information deduced from statistics that has been collected by the AP or a higher lay node in the network, e.g. an AP controller, an OAM node or an OSS node. Merely as an example, if a CCAT for a specific QoS category results in high failure rates or long delays, the CCAT for that specific QoS category may have to be decreased.

Once a CCAT has been updated, the AP transmits the updated CCAT to the wireless device such that the wireless device may use the updated CCAT for communication with the AP.

The determined first and/or second CCAT may be (i) specific for the wireless device, or (ii) common for all wireless devices communicating with the AP.

There may be a plurality of wireless devices located within a coverage area of the AP, which is generally referred to as a Basic Service Set, BSS. Different wireless devices may be associated with different priorities, some having higher priority than others. In such a scenario, a first wireless device associated with higher priority may be assigned a first set of CCATs that are different from a second set of CCATs that are assigned to a second wireless device associated with lower priority. The first set of CCATs may be selected such that it increases the probability for the first wireless device to access the channel compared to the second wireless device.

In the other alternative, all wireless devices may be associated with the same set of CCATs, wherein the CCATs of the set are associated with different QoS categories as described above.

Embodiments herein also relate to a method performed by a wireless device in a WLAN for communicating with an AP, the WLAN employing contention based access of a channel to the AP.

Figure 2A:
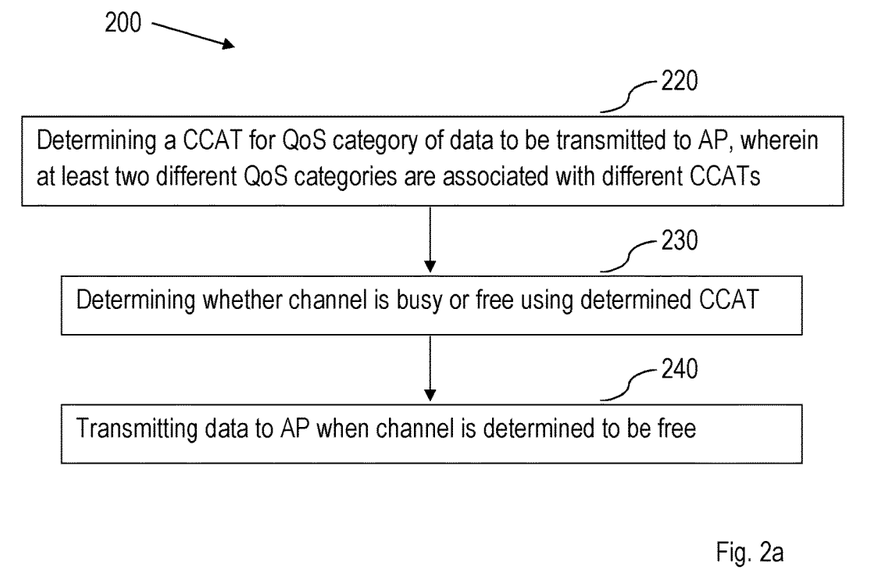
FIG. 2a is a flowchart of a method performed by a wireless device operable in a WLAN for communicating with an AP according to an exemplifying embodiment.

Embodiments of such a method will now be described with reference to FIGS. 2a-2b. FIG. 2a illustrates the method comprising determining 220 a CCAT for a QoS category of data to be transmitted to the AP, wherein at least two different QoS categories are associated with different CCATs; determining 230 whether the channel is busy or free using the determined CCAT: and transmitting 240 data to the AP when the channel is determined to be free.

The wireless device has data to send to the AP. The data is associated with a QoS category. Different QoS categories are associated with a respective CCAT, such that a first QoS category is associated with a first CCAT, a second QoS category is associated with a second CCAT, a third QoS category is associated with a third CCAT, and so on. There is at least two different CCATs, hence there is at least two predefined QoS categories. There may be more QoS categories than there are CCATs as some QoS categories may be assigned or associated with the same CCAT. Hence, there is at least a CCAT associated with a first QoS category, and a second CCAT associated with a second QoS category.

Consequently, the wireless device determines the CCAT for the QoS category of data to be transmitted to the AP. The wireless device then uses the CCAT for determining whether the channel is busy or free. The channel is determined free if any detected or received signal or energy is below the CCAT. Similarly, the channel is determined busy if any detected or received signal or energy is above the CCAT. The CCAT being specific for the QoS category of the data that the wireless device is to transmit to the AP.

In the above described manner, the channel is determined busy or free using the specific CCAT for the QoS category of the data that the wireless device is to transmit to the AP. When the channel is determined to be free, the wireless device transmits the data to the AP.

The method performed by the wireless device may have the same several advantages as the method performed by the AP. One possible advantage is that the flexibility of the QoS framework is improved and/or increased by introducing another degree of freedom to the parameters that can be adjusted in order to provide statistical differentiation between different traffic types.

Figure 2B:
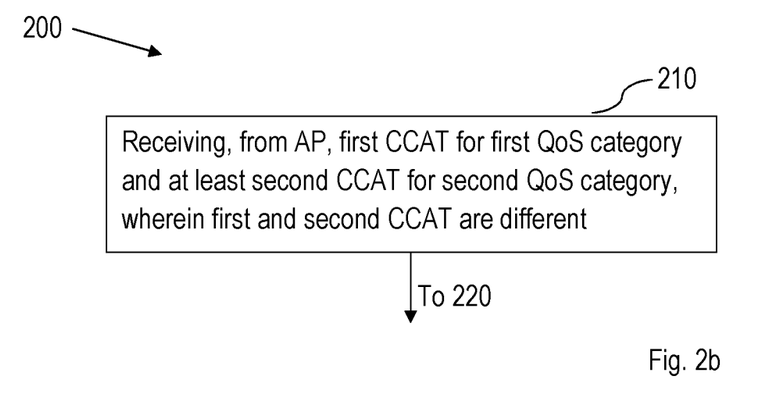
FIG. 2b is a flowchart of a method performed by a wireless device operable in a WLAN for communicating with an AP according to another exemplifying embodiment.

The method may further comprise, as illustrated in FIG. 2b, receiving 210, from the AP, a first CCAT for a first QoS category and at least a second CCAT for a second QoS category, whereby the first and second CCAT are different.

The first and the second, and possible further, CCATs may be predefined or they may be determined by the AP or a node in the wireless network. In case the CCATs are determined by the AP or a node in the wireless network, the wireless device may not have knowledge about the different CCATs. Thus, the wireless device may then receive the values of the different CCATs from the AP. Once the wireless device has the knowledge of the values of the different CCATs, the wireless device may start using them for communicating with the AP.

Determining 230 whether the channel is busy or free may further based on QoS category of data that is currently being transmitted on the channel as discovered when determining 230 whether the channel is busy or free.

When the wireless device senses the channel, or radio resources, in order to determine if the channel is busy or free, the wireless device might receive, or detect, signals or energy on the channel. If the signals are traffic, and not noise, the wireless device may either decode the signals, perform deep packet inspection or otherwise analyse the receive signals or energy in order to determine the QoS category of data that is currently being transmitted on the channel in the same, or similar, manner as the AP may do as described above.

The wireless device thus determines whether the channel is busy or free based on the CCAT of the QoS category of the data to be transmitted to the AP and also based on the QoS category of data that is currently being transmitted on the channel.

In an example, the channel is determined to be free if the level of a QoS category of the data to be transmitted to the AP is of higher priority than the level of the QoS category of data that is currently being transmitted on the channel.

By determining the QoS category of data that is currently being transmitted on the channel, the wireless device may compare that QoS category to the QoS category of the data to be transmitted to the AP.

As stated above, by increasing the CCAT for a certain QoS category, the traffic of that access class has increased probability of accessing the channel, but it comes at a risk of suffering from interference. Therefore the CCAT may e.g. only be increased for traffic types that are not sensitive to losing packets (e.g. it may not be suitable for voice and video but rather for best effort or background).

The wireless device may thus compare the QoS category of the data to be transmitted to the AP and QoS category of data that is currently being transmitted on the channel.

The channel may be determined to be free if the level of the QoS category of the data to be transmitted to the AP is of higher priority than the level of the QoS category of data that is currently being transmitted on the channel. Merely as a non-limiting and simplified example, assuming there are only two CCATs, a first CCAT for QoS category related for speech, and the same first CCAT for QoS category related for video; and a second CCAT QoS category related for best effort, and the same second CCAT for QoS category related for background. In this non-limiting and simplified example, data relating to speech or video has higher priority than data relating to best effort or background. Thus, if the wireless device is to transmit speech or video to the AP and uses the first CCAT for determining if the channel is busy or free, and then detects traffic carrying data relating to background or best effort, the wireless device determines the channel to be free and transmits its data to the AP.

However, in a more general, and not so simplified example, the wireless device may compare the QoS category of the data to be transmitted to the AP and QoS category of data that is currently being transmitted on the channel. In case there are more than two CCATs, e.g. four CCATs, CCAT_1, CCAT_2, CCAT_3 and CCAT_4. If the different CCATs have different values, then there can be different combinations of the CCAT of the data to be transmitted to the AP and the CCAT of the data that is currently being transmitted on the channel. Different combinations of different CCATs may be associated with different rules regarding how the wireless device should act for different combinations. The wireless device may thus, e.g. consult a lookup table comprising different rules for different combinations of CCATs. The different rules for different combinations may also reflect whether the CCAT is for the data to be transmitted to the AP (own-QoS) or for the data that is currently being transmitted on the channel (other-QoS). Consequently, a higher CCAT may be given when the own-QoS is higher than the other-QoS, but lower for the opposite case.

Also for the method performed by the wireless device, the respective QoS categories may be associated with Access Categories.

As described above, there are four different QoS differentiations in the IEEE 802.11 standard, referred to as access categories. These categories are VO, VI, BE and BK. The method performed by the wireless device may be employed by a wireless device operable in a network based on the IEEE 802.11 standard, wherein these already defined access categories may be used. However, it shall be pointed out that the access categories may be defined in other ways, e.g. when the wireless device is operable in a network based on another standard.

In addition to the CCAT, other parameters may be used in order to statistically differentiate types of traffic, e.g. Inter-Frame Spacing, IFS, Contention Window size, CW size, which may be defined by a CW_min and a CW_max representing lowest and highest number respectively for the contention window, Transmission Opportunity, TXOP, maximum allowed size.

Originally, data frames in 802.11 were sent using the Distributed Coordination Function, DCF. However, the DCF did not provide sufficient means for enabling QoS differentiation between different types of traffic or between different associated wireless devices. The 802.11e amendment resolved this by introducing the Enhanced Distributed Channel Access, EDCA, by which a certain set of parameters could be adjusted in such a way so that a certain type of traffic is handled with a different priority than another (in the statistical sense). Those parameters are the IFS, CW size, and TXOP as described above.

Also as described above, in the 802.11 standard, four access categories are defined, VO, VI, BE, and BK. For each access category, there is a set of IFS, CW and TXOP limit values and all together, the values for the four access categories are referred to as Enhanced Distributed Channel Access, EDCA, parameter set. The WLAN AP may advertise the EDCA parameter set via the EDCA Parameter set element, in a Beacon, Probe Response, Association Response or Re-association Response frames. Different QoS wireless devices (wireless devices that support the 802.11e mechanisms) that are associated or are in process of associating to an AP will use the EDCA parameters advertised by that AP for the uplink direction. In general the AP might choose to use different EDCA parameters for the downlink direction.

Figure 3A:
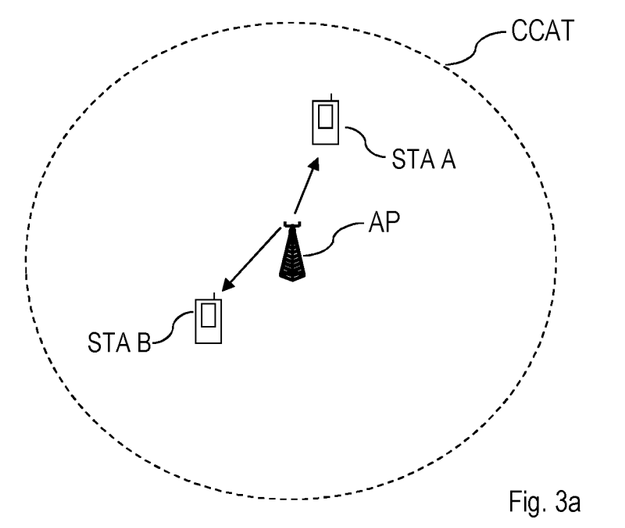
FIG. 3a is a schematic illustration of a relation between the spatial area from where transmitting nodes will cause the AP to consider the channel as being busy and the CCAT.
Figure 3B:
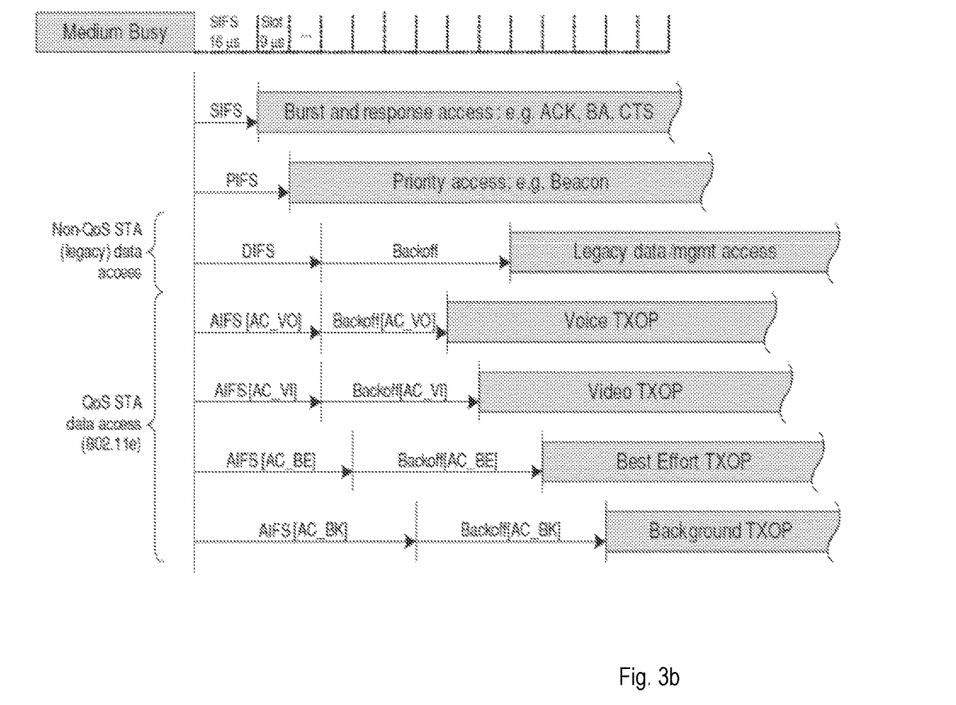
FIG. 3b is an exemplifying illustration of channel access priorities including Enhanced Distributed Channel Access, EDCA, with associated timing.

The channel access timing (i.e. priorities) for the different access categories, ACs, and also for non-QoS traffic is shown in FIG. 3b.

Figure 3C:
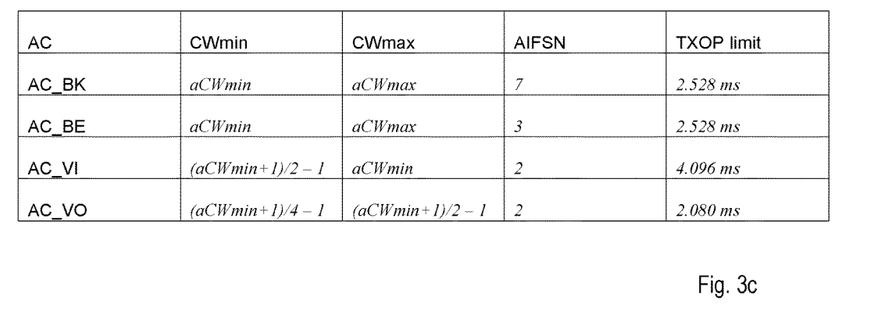
FIG. 3c is an exemplifying illustration of the EDCA parameter set element with example values.

The EDCA parameter set has the format as illustrated in FIG. 3c. In the figure, some exemplifying values are provided for the sake of clarity. It shall be pointed out that these values are merely examples and are not to be understood as, or taken for, optimum, preferable or in other way guiding values.

Figure 3D:
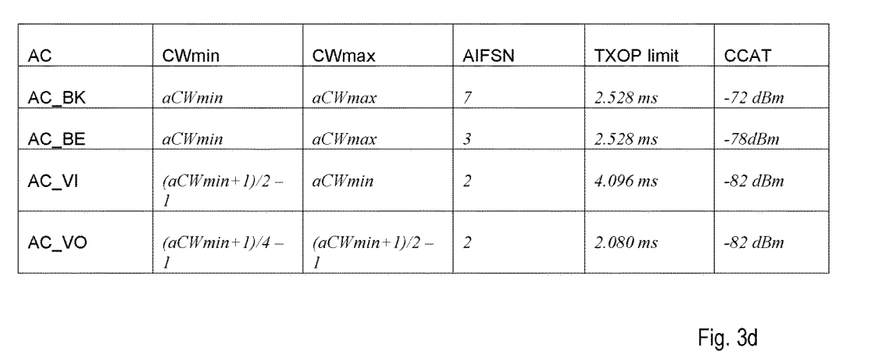
FIG. 3d is an exemplifying illustration of the CCAT and the EDCA parameter set element with example values.

In an example, both the EDCA parameter set and the different CCATs for different QoS categories may be used together to further increase flexibility and efficiency for the communication between the AP and the wireless device. An example of using the EDCA parameter set and the different CCATs for different QoS categories together is illustrated in FIG. 3d. It shall be pointed out that also these values in FIG. 3d are merely examples and are not to be understood as, or taken for, optimum, preferable or in other way guiding values.

In FIG. 3d, the CCATs are exemplified as "exact" values, however, as described above, the CCAT value comprise a range of values to be considered (e.g. CCAT_min and CCAT_max). In this way, a particular wireless device that applies the different CCATs for different QoS categories may have the liberty to adapt the CCAT based on a specific mechanism.

The different CCATs may be the signal detection threshold, an energy detection threshold, RX (receiver) sensitivity level, a combination of these, or all of them.

The CCAT may be communicated from the AP to the wireless device using the same mechanisms used to communicate the EDCA parameter pet element—it could be either broadcasted by the AP (i.e. the AP includes the enhanced EDCA parameter set and the different CCATs in beacon frames), or unicasted to a particular wireless device, i.e. the AP includes the EDCA parameter set and the different CCATs either in probe response, Association or Reassociation Response or Channel Usage Response.

In an example, the relative channel access of the different access categories may be measured by the AP or some central node, and then CCAT values for different access categories may be updated to reach a certain desired relative channel access distribution between the access categories. This desired distribution may in turn be dependent on some statistics derived from the traffic, e.g. number of sessions of different type, the long-term average traffic volume for different access categories.

Further, as described above, the AP and/or the wireless device may apply the CCAT of each QoS category based on the type of traffic it detects on the channel and/or that it overhears from a neighbour BSS.

The access categories, ACs, video and voice have higher requirements on latency and throughput hence should be protected from interference. If an AP or wireless device detects these types of traffic, the AP or wireless device should utilise lower CCAT values to avoid interfering the ongoing transmission (as illustrated in an exemplifying manner in FIG. 3d).

In an example, the access category information may be included in a PHY header so that an AP or wireless device may identify the type of traffic by reading the header. In another example, the real time traffic access category information may be exchanged between APs so that corresponding CCAT may be configured in neighbour BSSs.

Figure 3E:
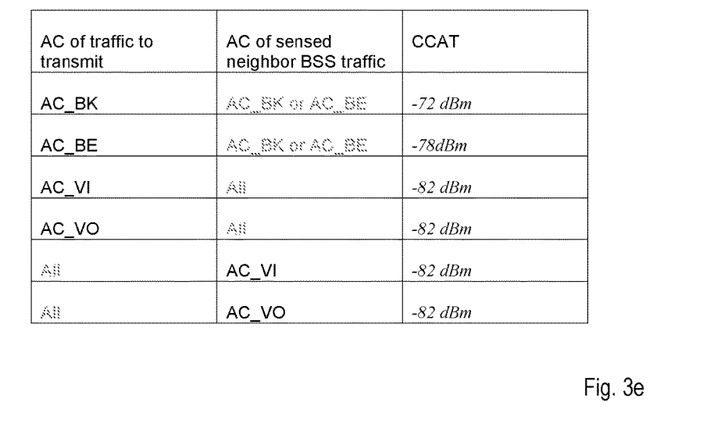
FIG. 3e is an exemplifying illustration of CCAT per transmitting and sensed traffic access category combination with example values.

In yet another example, an AP or wireless device may determine the CCATs based on the combination of transmission traffic types and sensed traffic type. Comparing to the other two examples, this method may provide a higher degree of freedom in CCAT determination. An example of CCAT values in such combination is given in FIG. 3e in an exemplifying manner.

Embodiments herein also relate to an AP in a WLAN for communicating with a wireless device, the WLAN employing contention based access for radio resources. The AP has the same technical features, objects and advantages as the method performed by the AP. Hence, the AP will only be described in brief in order to avoid unnecessary repetition.

Figure 4:
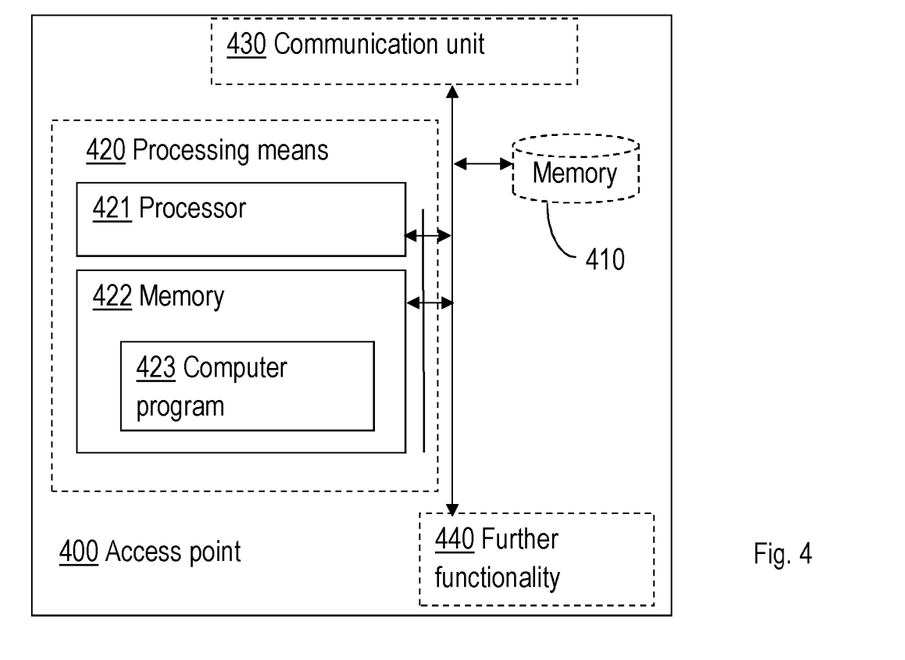
FIG. 4 is a block diagram of an AP operable in a WLAN for communicating with a wireless device according to an exemplifying embodiment.
Figure 5:
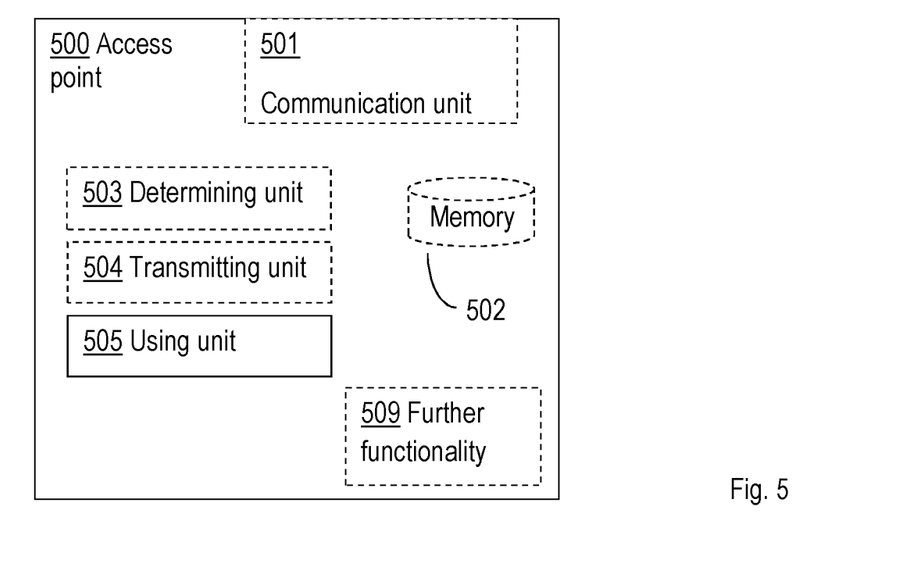
FIG. 5 is a block diagram of an AP operable in a WLAN for communicating with a wireless device according to another exemplifying embodiment.

Embodiments of such an AP will now be described with reference to FIGS. 4 and 5. FIGS. 4 and 5 illustrate the AP 400, 500 being configured for using a first CCAT for a first QoS category and at least a second CCAT for a second QoS category for communication with the wireless device.

The AP may be realised on implemented in various ways. A first exemplifying realisation or implementation is illustrated in FIG. 4. FIG. 4 illustrates the AP comprising a processor 421 and memory 422, the memory comprising instructions, e.g. by means of a computer program 423, which when executed by the processor 421 causes the AP 400 to use a first CCAT for a first QoS category and at least a second CCAT for a second QoS category for communication with the wireless device.

FIG. 4 also illustrates the AP 400 comprising a memory 410. It shall be pointed out that FIG. 4 is merely an exemplifying illustration and memory 410 may be optional, be a part of the memory 422 or be a further memory of the AP 400. The memory may for example comprise information relating to the AP 400, to statistics of operation of the AP 400, just to give a couple of illustrating examples. FIG. 4 further illustrates the AP 400 comprising processing means 420, which comprises the memory 422 and the processor 421. Still further, FIG. 4 illustrates the AP 400 comprising a communication unit 430. The communication unit 430 may comprise an interface through which the AP 400 communicates with other nodes or entities of the WLAN as well as other communication units. FIG. 4 also illustrates the AP 400 comprising further functionality 440. The further functionality 440 may comprise hardware of software necessary for the AP 400 to perform different tasks that are not disclosed herein.

An alternative exemplifying realisation, or implementation, of the AP is illustrated in FIG. 5. FIG. 5 illustrates the AP 500 comprising a using unit 505 for using a first CCAT for a first QoS category and at least a second CCAT for a second QoS category for communication with the wireless device.

FIG. 5 also illustrates the AP 500 comprising a determining unit 503 and a transmitting unit 505. These units may be optional and are therefore illustrated having dotted lines.

In FIG. 5, the AP 500 is also illustrated comprising a communication unit 501. Through this unit, the AP 500 is adapted to communicate with other nodes and/or entities in the WLAN. The communication unit 501 may comprise more than one receiving arrangement. For example, the communication unit 501 may be connected to both a wire and an antenna, by means of which the AP 500 is enabled to communicate with other nodes and/or entities in the wireless communication network. Similarly, the communication unit 501 may comprise more than one transmitting arrangement, which in turn is connected to both a wire and an antenna, by means of which the AP 500 is enabled to communicate with other nodes and/or entities in the wireless communication network. The AP 500 further comprises a memory 502 for storing data. Further, the AP 500 may comprise a control or processing unit (not shown) which in turn is connected to the different units 503-504. It shall be pointed out that this is merely an illustrative example and the AP 500 may comprise more, less or other units or modules which execute the functions of the AP 500 in the same manner as the units illustrated in FIG. 5.

It should be noted that FIG. 5 merely illustrates various functional units in the AP 500 in a logical sense. The functions in practice may be implemented using any suitable software and hardware means/circuits etc. Thus, the embodiments are generally not limited to the shown structures of the AP 500 and the functional units. Hence, the previously described exemplary embodiments may be realised in many ways. For example, one embodiment includes a computer-readable medium having instructions stored thereon that are executable by the control or processing unit for executing the method steps in the AP 500. The instructions executable by the computing system and stored on the computer-readable medium perform the method steps of the AP 500 as set forth in the claims.

The method performed by the AP may have several advantages. One possible advantage is that the flexibility of the QoS framework is improved and/or increased by introducing another degree of freedom to the parameters that can be adjusted in order to provide statistical differentiation between different traffic types.

The AP may further be adapted for determining the first CCAT and/or the second CCAT for the first and second QoS category.

According to an embodiment, the AP may further be configured for transmitting the first CCAT and/or the second CCAT for the first and second QoS category to the wireless device.

According to yet an embodiment, the AP may further be configured for determining of the first and/or second CCAT by determining respective intervals for the first and second CCATs within which the first and the second CCATs may vary.

According to still an embodiment, the AP may further be configured for, when using the determined first and/or second CCAT for communication with the wireless device: determining whether the channel is busy or free using the CCAT for the QoS category of the data to be transmitted to the wireless device; and transmitting data to the wireless device when the channel is free.

According to another embodiment, the AP may further be configured for the determining of whether the channel is busy or free further based on a QoS category of data that is currently being transmitted on the channel as discovered during the determining of whether the channel is busy or free.

According to an embodiment, the channel is determined to be free if the level of the QoS category of the data to be transmitted to the wireless device is of higher priority than the level of the QoS category of data that is currently being transmitted on the channel.

According to yet an embodiment, the respective QoS categories are associated with Access Categories.

According to still an embodiment, the AP may further be configured for updating at least one of the CCATs and for transmitting the updated at least one CCAT to the wireless device.

According to another embodiment, wherein the determined first and/or second CCAT is/are (i) specific for the wireless device, or (ii) common for all wireless devices communicating with the AP.

Embodiments herein also relate to a wireless device in a WLAN for communicating with an AP, the WLAN employing contention based access for radio resources. The wireless device has the same technical features, objects and advantages as the method performed by the wireless device. Hence, the wireless device will only be described in brief in order to avoid unnecessary repetition.

Figure 6:
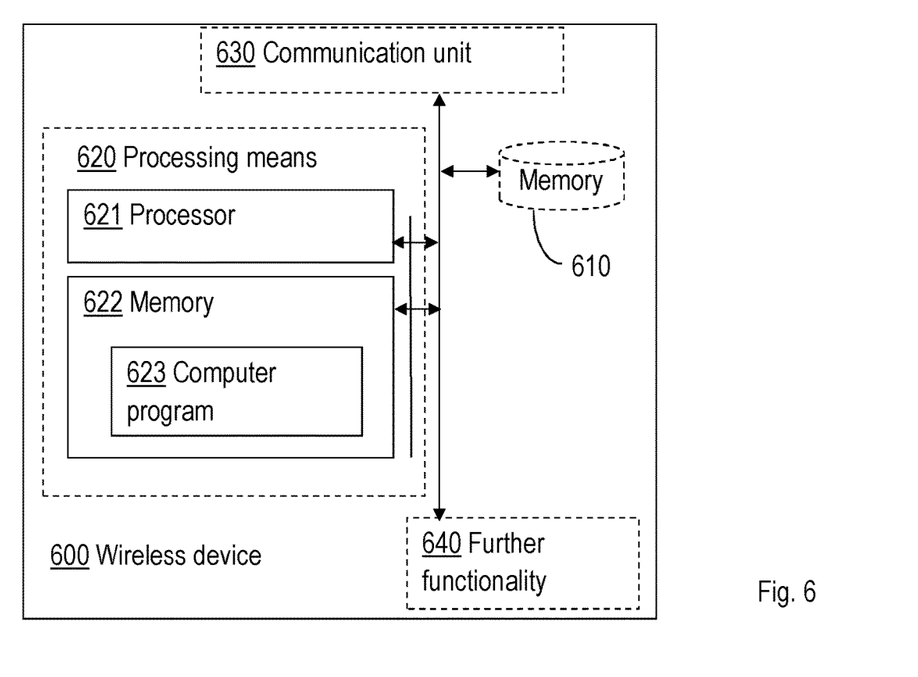
FIG. 6 is a block diagram of a wireless device operable in a WLAN for communicating with an AP according to an exemplifying embodiment.
Figure 7:
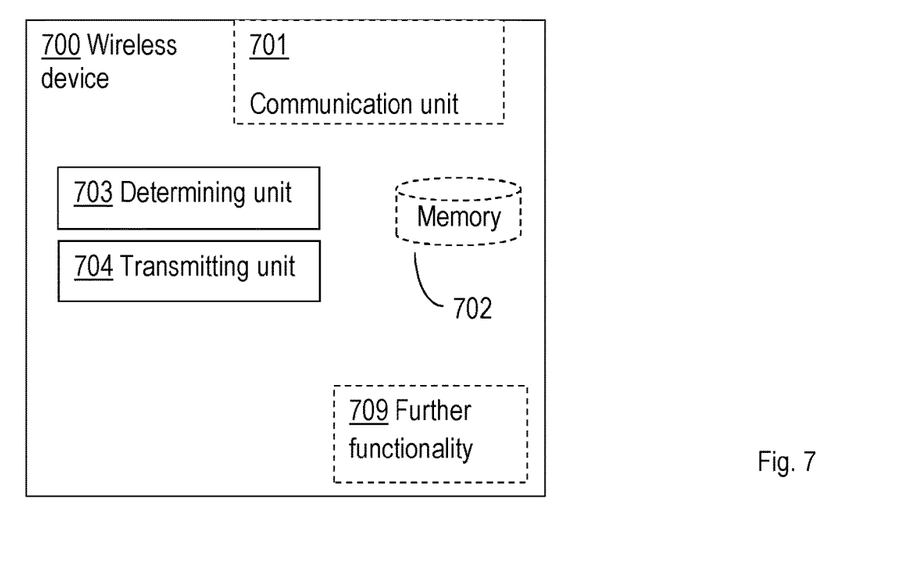
FIG. 7 is a block diagram of a wireless device operable in a WLAN for communicating with an AP according to another exemplifying embodiment.

Embodiments of such a wireless device will now be described with reference to FIGS. 6 and 7. FIGS. 6 and 7 illustrate the wireless device 600, 700 being configured for determining, a CCAT for a QoS category of data to be transmitted to the AP, wherein at least two different QoS categories are associated with different CCATs; for determining whether the channel is busy or free using the determined CCAT; and for transmitting data to the AP when the channel is determined to be free.

The wireless device may be realised on implemented in various ways. A first exemplifying realisation or implementation is illustrated in FIG. 6. FIG. 6 illustrates the wireless device comprising a processor 621 and memory 622, the memory comprising instructions, e.g. by means of a computer program 623, which when executed by the processor 621 causes the wireless device 600 to determine, a CCAT for a QoS category of data to be transmitted to the AP, wherein at least two different QoS categories are associated with different CCATs; to determine whether the channel is busy or free using the determined CCAT; and to transmit data to the AP when the channel is determined to be free.

FIG. 6 also illustrates the wireless device 600 comprising a memory 610. It shall be pointed out that FIG. 6 is merely an exemplifying illustration and memory 610 may be optional, be a part of the memory 622 or be a further memory of the wireless device 600. The memory may for example comprise information relating to the wireless device 600, to statistics of operation of the wireless device 600, just to give a couple of illustrating examples. FIG. 6 further illustrates the wireless device 600 comprising processing means 620, which comprises the memory 622 and the processor 621. Still further, FIG. 6 illustrates the wireless device 600 comprising a communication unit 630. The communication unit 630 may comprise an interface through which the wireless device 600 communicates with other nodes or entities of the WLAN as well as other communication units. FIG. 6 also illustrates the wireless device 600 comprising further functionality 640. The further functionality 640 may comprise hardware of software necessary for the wireless device 600 to perform different tasks that are not disclosed herein.

An alternative exemplifying realisation, or implementation, of the wireless device is illustrated in FIG. 7. FIG. 7 illustrates the wireless device 700 comprising a determining unit 703 for determining a CCAT for a QoS category of data to be transmitted to the AP, wherein at least two different QoS categories are associated with different CCATs; and for determining whether the channel is busy or free using the determined CCAT. FIG. 7 also illustrates the wireless device 700 comprising a transmitting unit 704 for transmitting data to the AP when the channel is determined to be free.

In FIG. 7, the wireless device 700 is also illustrated comprising a communication unit 701. Through this unit, the wireless device 700 is adapted to communicate with other nodes and/or entities in the WLAN. The communication unit 701 may comprise more than one receiving arrangement. For example, the communication unit 701 may be connected to both a wire and an antenna, by means of which the wireless device 700 is enabled to communicate with other nodes and/or entities in the wireless communication network. Similarly, the communication unit 701 may comprise more than one transmitting arrangement, which in turn is connected to both a wire and an antenna, by means of which the wireless device 700 is enabled to communicate with other nodes and/or entities in the wireless communication network. The wireless device 700 further comprises a memory 702 for storing data. Further, the wireless device 700 may comprise a control or processing unit (not shown) which in turn is connected to the different units 703-704. It shall be pointed out that this is merely an illustrative example and the wireless device 700 may comprise more, less or other units or modules which execute the functions of the wireless device 700 in the same manner as the units illustrated in FIG. 7.

It should be noted that FIG. 7 merely illustrates various functional units in the wireless device 700 in a logical sense. The functions in practice may be implemented using any suitable software and hardware means/circuits etc. Thus, the embodiments are generally not limited to the shown structures of the wireless device 700 and the functional units. Hence, the previously described exemplary embodiments may be realised in many ways. For example, one embodiment includes a computer-readable medium having instructions stored thereon that are executable by the control or processing unit for executing the method steps in the wireless device 700. The instructions executable by the computing system and stored on the computer-readable medium perform the method steps of the wireless device 700 as set forth in the claims.

The wireless device has the same possible advantages as the method performed by the wireless device. One possible advantage is that the flexibility of the QoS framework is improved and/or increased by introducing another degree of freedom to the parameters that can be adjusted in order to provide statistical differentiation between different traffic types.

According to an embodiment, the wireless device 600, 700 may further be configured for receiving, from the AP, a first CCAT for a first QoS category and at least a second CCAT for a second QoS category, whereby the first and second CCAT are different.

According to yet an embodiment, the wireless device 600, 700 may further be configured for determining whether the channel is busy or free further based on QoS category of data that is currently being transmitted on the channel as discovered when determining 230 whether the channel is busy or free.

According to still an embodiment, the channel is determined to be free if the level of a QoS category of the data to be transmitted to the AP is of higher priority than the level of the QoS category of data that is currently being transmitted on the channel.

According to another embodiment, the respective QoS categories are associated with Access Categories.

Figure 8:
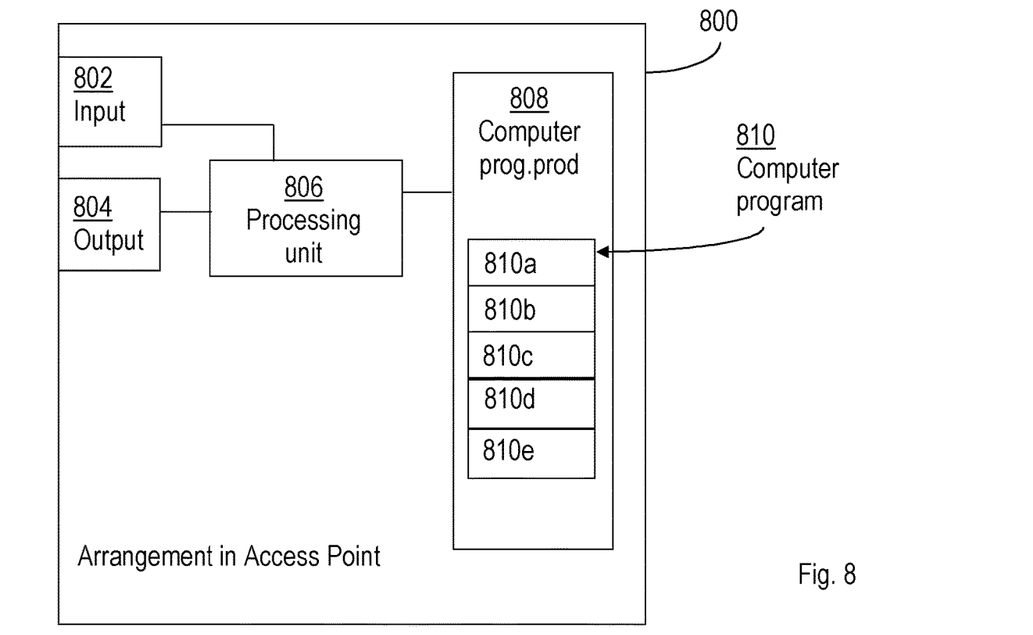
FIG. 8 a block diagram of an arrangement in an AP operable in a WLAN for communicating with a wireless device according to an exemplifying embodiment.

FIG. 8 schematically shows an embodiment of an arrangement 800 in an AP 500. Comprised in the arrangement 800 in the AP 500 are here a processing unit 806, e.g. with a Digital Signal Processor, DSP. The processing unit 806 may be a single unit or a plurality of units to perform different actions of procedures described herein. The arrangement 800 of the AP 500 may also comprise an input unit 802 for receiving signals from other entities, and an output unit 804 for providing signal(s) to other entities. The input unit and the output unit may be arranged as an integrated entity or as illustrated in the example of FIG. 5, as one or more interfaces 501.

Furthermore, the arrangement in the AP 500 comprises at least one computer program product 808 in the form of a non-volatile memory, e.g. an Electrically Erasable Programmable Read-Only Memory, EEPROM, a flash memory and a hard drive. The computer program product 808 comprises a computer program 810, which comprises code means, which when executed in the processing unit 806 in the arrangement 800 in the AP 500 causes the AP to perform the actions e.g. of the procedure described earlier in conjunction with FIGS. 1a-1c.

The computer program 810 may be configured as a computer program code structured in computer program modules 810a-810e. Hence, in an exemplifying embodiment, the code means in the computer program of the arrangement 800 in the AP comprises a using unit, or module, for using a first CCAT for a first QoS category and at least a second CCAT for a second QoS category for communication with the wireless device.

The computer program modules could essentially perform the actions of the flow illustrated in FIGS. 1a-1c, to emulate the AP 500. In other words, when the different computer program modules are executed in the processing unit 806, they may correspond to the unit 505 of FIG. 5.

Figure 9:
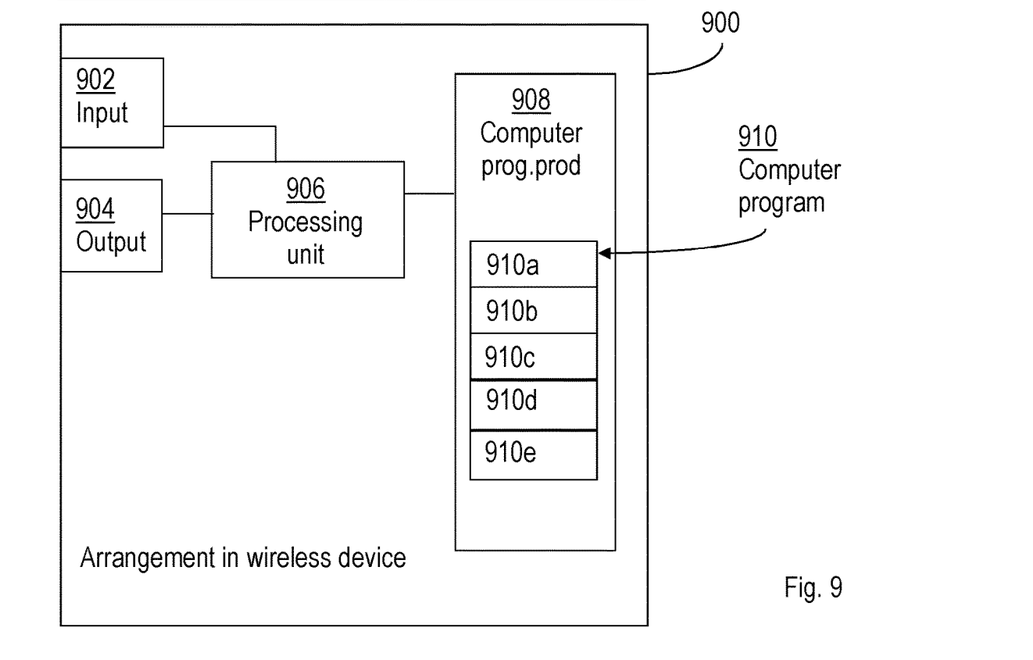
FIG. 9 is a block diagram of an arrangement in a wireless device operable in a WLAN for communicating with an AP according to another exemplifying embodiment.

FIG. 9 schematically shows an embodiment of a wireless device 900. Comprised in the wireless device 900 are here a processing unit 906, e.g. with a Digital Signal Processor. The processing unit 906 may be a single unit or a plurality of units to perform different actions of procedures described herein. The wireless device 900 may also comprise an input unit 902 for receiving signals from other entities, and an output unit 904 for providing signal(s) to other entities. The input unit and the output unit may be arranged as an integrated entity or as illustrated in the example of FIG. 7, as one or more interfaces 701.

Furthermore, the wireless device 900 comprises at least one computer program product 908 in the form of a non-volatile memory, e.g. an Electrically Erasable Programmable Read-Only Memory, EEPROM, a flash memory and a hard drive. The computer program product 908 comprises a computer program 910, which comprises code means, which when executed in the processing unit 906 in the arrangement 900 in the wireless device causes the wireless device to perform the actions e.g. of the procedure described earlier in conjunction with FIGS. 2a and 2b.

The computer program 910 may be configured as a computer program code structured in computer program modules 910a-910e. Hence, in an exemplifying embodiment, the code means in the computer program of the arrangement 900 in the wireless device comprises a determining unit, or module, for determining, a CCAT for a QoS category of data to be transmitted to the AP, wherein at least two different QoS categories are associated with different CCATs; for determining whether the channel is busy or free using the determined CCAT. The computer program further comprises a transmitting unit, or module, for transmitting data to the AP when the channel is determined to be free.

The computer program modules could essentially perform the actions of the flow illustrated in FIGS. 2a and 2b, to emulate the wireless device 700. In other words, when the different computer program modules are executed in the processing unit 906, they may correspond to the units 703-704 of FIG. 7.

Although the code means in the respective embodiments disclosed above in conjunction with FIGS. 5 and 7 are implemented as computer program modules which when executed in the respective processing unit causes the AP and the wireless device respectively to perform the actions described above in the conjunction with figures mentioned above, at least one of the code means may in alternative embodiments be implemented at least partly as hardware circuits.

The processor may be a single Central Processing Unit, CPU, but could also comprise two or more processing units. For example, the processor may include general purpose microprocessors; instruction set processors and/or related chips sets and/or special purpose microprocessors such as Application Specific Integrated Circuits, ASICs. The processor may also comprise board memory for caching purposes. The computer program may be carried by a computer program product connected to the processor. The computer program product may comprise a computer readable medium on which the computer program is stored. For example, the computer program product may be a flash memory, a Random-Access Memory RAM, Read-Only Memory, ROM, or an EEPROM, and the computer program modules described above could in alternative embodiments be distributed on different computer program products in the form of memories within the AP and the wireless device respectively.

It is to be understood that the choice of interacting units, as well as the naming of the units within this disclosure are only for exemplifying purpose, and nodes suitable to execute any of the methods described above may be configured in a plurality of alternative ways in order to be able to execute the suggested procedure actions.

It should also be noted that the units described in this disclosure are to be regarded as logical entities and not with necessity as separate physical entities.

While the embodiments have been described in terms of several embodiments, it is contemplated that alternatives, modifications, permutations and equivalents thereof will become apparent upon reading of the specifications and study of the drawings. It is therefore intended that the following appended claims include such alternatives, modifications, permutations and equivalents as fall within the scope of the embodiments and defined by the pending claims.

The invention claimed is:

1. A method performed by an Access Point (AP) for communicating with a wireless device in a Wireless Local Area Network (WLAN) employing contention-based access for radio resources, the method comprising:
   determining, based on a Quality of Service (QoS) category of data to be transmitted to the wireless device, at least one Clear Channel Assessment Threshold (CCAT) from among a first CCAT for a first QoS category and at least a second CCAT for a second QoS category;
   determining whether the channel is busy or free based on the determined CCAT of the data to be transmitted and on a QoS category of further data being transmitted on the channel as discovered when determining whether the channel is busy or free; and
   transmitting data to the wireless device when the channel is free.

2. A method according to claim 1, further comprising determining the first CCAT and/or the second CCAT for the first and second QoS category.

3. A method according to claim 1, further comprising transmitting the first CCAT and/or the second CCAT for the first and second QoS category to the wireless device.

4. A method according to claim 2, wherein the determining of the first and/or second CCAT comprises determining respective intervals for the first and second CCATs within which the first and the second CCATs may vary.

5. A method according to claim 1, wherein the channel is determined to be free if a priority level of the QoS category of the data to be transmitted to the wireless device is of higher priority than a priority level of the QoS category of data that is currently being transmitted on the channel.

6. A method according to claim 1, wherein the respective QoS categories are associated with Access Categories.

7. A method according to claim 1, further comprising updating at least one of the CCATs and transmitting the updated at least one CCAT to the wireless device.

8. A method performed by a wireless device for communicating with an Access Point (AP) in a Wireless Local Area Network (WLAN) employing contention-based access of a channel to the AP, the method comprising:
   determining a Clear Channel Assessment Threshold (CCAT) for a Quality of Service (QoS) category of data to be transmitted to the AP, wherein at least two different QoS categories are associated with different CCATs;
   determining whether the channel is busy or free using the determined CCAT of the data to be transmitted and a QoS category of further data being transmitted on the channel as discovered when determining whether the channel is busy or free; and
   transmitting the data to the AP when the channel is determined to be free.

9. A method according to claim 8, further comprising receiving, from the AP, a first CCAT for a first QoS category and at least a second CCAT for a second QoS category, whereby the first and second CCAT are different.

10. A method according to claim 8, wherein the channel is determined to be free if a priority level of a QoS category of the data to be transmitted to the AP is of higher priority than a priority level of the QoS category of the further data being transmitted on the channel.

11. An Access Point (AP) for communicating with a wireless device in a Wireless Local Area Network (WLAN) employing contention-based access for radio resources, the AP comprising:
   at least one processor; and
   at least one memory storing computer-executable instructions that, when executed by the at least one processor, configure the AP to:
      determine, based on a Quality of Service (QoS) category of data to be transmitted to the wireless device, at least one Clear Channel Assessment Threshold (CCAT) from among a first CCAT for a first QoS category and at least a second CCAT for a second QoS category;
      determine whether the channel is busy or free based on the determined CCAT of the data to be transmitted and on a QoS category of further data being transmitted on the channel as discovered when determining whether the channel is busy or free; and
      transmitting data to the wireless device when the channel is free.

12. An Access Point (AP) according to claim 11, wherein execution of the instructions further configures the AP to determine the first CCAT and/or the second CCAT for the first and second QoS category.

13. An Access Point (AP) according to claim 11, wherein execution of the instructions further configures the AP to transmit the first CCAT and/or the second CCAT for the first and second QoS category to the wireless device.

14. A wireless device for communicating with an Access Point (AP) in a Wireless Local Area Network (WLAN) employing contention-based access of a channel to the AP, the wireless device comprising:
   at least one processor; and
   at least one memory storing computer-executable instructions that, when executed by the at least one processor, configure the AP to:
      determine a Clear Channel Assessment Threshold (CCAT) for a Quality of Service (QoS) category of data to be transmitted to the AP, wherein at least two different QoS categories are associated with different CCATs;
      determine whether the channel is busy or free based on the determined CCAT of the data to be transmitted and on a QoS category of further data being transmitted on the channel as discovered when determining whether the channel is busy or free; and
      transmit data to the AP when the channel is determined to be free.

15. A wireless device according to claim 14, wherein execution of the instructions further configures the wireless device to receive, from the AP, a first CCAT for a first QoS category and at least a second CCAT for a second QoS category, whereby the first and second CCAT are different.

16. A wireless device according to claim 14, wherein execution of the instructions further configures the wireless device to determine the channel to be free if a priority level of a QoS category of the data to be transmitted to the AP is of higher priority than a priority level of the QoS category of the further data being transmitted on the channel.

* * * * *